April 18, 1950 A. J. F. SIEGERT ET AL 2,504,888
RADIOACTIVE BOREHOLE LOGGING
Filed Dec. 27, 1946
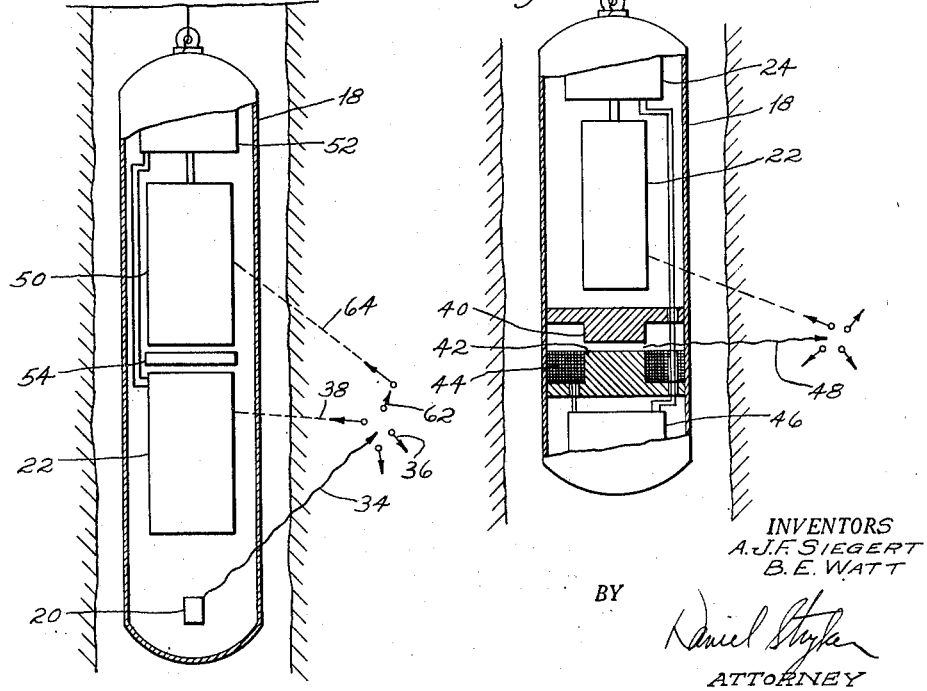
INVENTORS
A. J. F. SIEGERT
B. E. WATT
BY
ATTORNEY Patented Apr. 18, 1950

2,504,888

UNITED STATES PATENT OFFICE 2,504,888

RADIOACTIVE BOREHOLE LOGGING

Arnold J. F. Siegert, Syracuse, N. Y., and Bob E. Watt, Houston, Tex., assignors to Texaco Development Corporation, New York, N. Y., a corporation of Delaware Application December 27, 1946, Serial No. 718,690

9 Claims. (Cl. 250—83.6)

This invention relates to radioactive well or bore hole logging and more particularly to a method and an apparatus by means of which the formations surrounding the well or a bore hole are bombarded with penetrative radiation whereby radiation of another type is induced in the formations, some of which passes to the bore hole near the source where its intensity is measured. The principal object of the invention is the provision of a method and an apparatus of this type by means of which the nature of the formations traversed by the bore hole can be determined, particularly the elements or substances of which the formations are composed.

It is known that when certain elements are bombarded by gamma rays neutrons are ejected from the nuclei. The neutron intensity depends on the gamma ray energy and the kind of nucleus. For a more complete discussion of this phenomenon reference may be had to the article entitled "Nuclear dynamics, experimental" by M. Stanley Livingston and H. A. Bethe, which appeared in the July 1937 issue of Review of Modern Physics, vol. 9, No. 3 published by the American Institute of Physics, Lancaster, Penna., particularly to pages 351 through 353 of the article under the heading "Photo-electric disintegration." It is clearly brought out in that article that when elements are bombarded by gamma rays of the proper energy neutrons are ejected from the nuclei of the bombarded materials. In order that neutrons will be ejected from a particular substance it is usually necessary that the bombarding gamma rays have energy equal to or greater than the binding energy of the neutrons in the nuclei of that substance. On page 353 of the above mentioned article a list is given of several elements together with the gamma ray energies necessary for the ejection of neutrons from the different elements.

In accordance with the present invention a source of gamma rays together with a neutron detector is passed through the bore hole or points in the bore hole and the intensities of the neutrons ejected from the surrounding formations due to bombardment by the gamma rays are measured. By making several logs of the hole with gamma ray sources of different energies information can be obtained as to the nature of the surrounding formations. In one embodiment of the invention an artificial source of gamma rays can be placed in the hole and the generator energized to produce progressively larger or smaller gamma ray energies. Thus, with one passage of the logging instrument through the hole information as to the existence and location of various elements in the surrounding formations can be obtained and recorded. By "gamma rays" as used throughout this specification and claims, we mean radiation of the electromagnetic type such as is spontaneously emitted by radio-active atoms or is produced in particle accelerators such, for example, as the betatron.

For a better understanding of the invention reference may be had to the accompanying drawing in which:

Figure 1 is a somewhat diagrammatic vertical elevation through a bore hole showing a logging instrument suspended therein;

Figure 2 is a vertical elevation of a portion of the hole showing a logging instrument containing a source of artificial gamma rays, and Figure 3 is a verticle sectional elevation through a bore hole showing a logging instrument containing both neutron and gamma ray detectors.

Referring to the drawing, a bore hole 10 is shown as traversing several surface formations such as 12, 14 and 16. Within the hole 10 is a logging instrument comprising essentially a housing 18 containing a source 20 of gamma rays and a neutron detector 22. The housing 18 may also enclose a preamplifier 24 which serves to amplify the output of the detector 22. The logging instrument is suspended by means of a cable 26 containing conductors for conveying the preamplified output of the detector 22 to the surface. The cable 26 passes over a suitable measuring device 28 by means of which the depth or position of the instrument in the hole can be continuously determined. The preamplified output of the detector 22 passes to a suitable amplifier 30 and then to a recorder 32 which may be in the nature of a recording galvanometer and by means of which a continuous record can be made of the output of the detector 22 as the logging instrument is passed through the hole.

Gamma rays indicated at 34 emitted by the source 20 penetrate the formations surrounding the hole and due to the photo-electric disintegration mentioned hereinabove cause neutrons 36 to be ejected from the elements making up the formations. Some of these neutrons such as that indicated at 38 pass toward the bore hole and strike the detector 22 which, with its associated circuits, serves to measure the intensity of these neutrons. The detector 22 may comprise an ionization chamber in which case a shield will be placed between the source 20 and the detector so as to absorb gamma rays passing directly from the source to the detector. The detector 22 may comprise a proportional counter which will not be primarily responsive to gamma rays but which will detect the neutrons which may strike it. A detector of this type is disclosed in the co-pending application of Gerhard Herzog and Kenneth C. Crumrine, Serial No. 511,990, filed November 27, 1943, now U. S. Letters Patent No. 2,443,731, granted June 22, 1948.

Since, as has been explained hereinabove the intensity of the ejected neutrons will depend upon the nature of the formations bombarded by the gamma rays, the record produced by the device 22 will provide a log of the formations traversed by the bore hole through which the logging instrument is passed, and by correlating this measurement with the depth of the instrument in the hole the location of the boundaries of the various substrata can be ascertained. If desired, several logs of the hole may be made using gamma ray sources 20 capable of emitting gamma rays of progressively higher or lower energies and an analysis of these logs will provide still more information as to the nature of the surrounding formations. Thus by bombarding the formations with gamma rays of say 9 or 10 million electron volts the intensity of neutrons ejected from a particular formation may show the presence of silicon which would indicate that the formation is a sandstone. By subsequently bombarding the same formation with gamma rays having an energy of about 16 million electron volts, a greater neutron intensity might indicate the presence of oxygen and thus that the formation might contain either sandstone or limestone. By again bombarding the formation with gamma rays having an energy of about 19 million electron volts a greater increase in the measured neutrons might indicate the presence of carbon and thus the fact that the formation contained limestone or oil. It will be seen then that by bombarding the formations with gamma rays of different energies an indication may be had as to the constituents making up the formations.

Instead of using a natural gamma ray source in the logging instrument an artificial source can be used such as the betatron shown diagrammatically in Figure 2. In this figure the housing 18 contains a neutron detector 22 and a preamplifier 24 and a gamma ray generator shown diagrammatically by the magnetic pole pieces 40 and 42 and an energizing winding 44 surrounding one of the pole pieces. The alternating current for energizing the winding 44 may be passed downwardly through the cable 26 and then to suitable control circuits indicated at 46 and thence to the winding 44. The preamplifier 24 in this case may of course be provided with suitable filters so that the voltage necessary to actuate the detector 22 may be taken from the alternating current passing downwardly through the cable as is well known. By means of the device shown in Figure 2 gamma rays having the desired energies can be generated and by suitable control of the device the energy of the emitted gamma rays such as shown at 48 may be varied. The operation of the betatron is now well understood and it is scarcely necessary to state that by suitable arrangements and shape of the target the direction of the gamma rays passing from the generator can be controlled. Thus the gamma rays may pass outwardly from the generator in a complete circle or they may be directed outwardly from one side of the device so that they will be concentrated in any desired angle. Since the gamma rays are ejected intermittently in pulses the detector 22 may be cut out of circuit by any suitable means at the instant when the gamma rays are ejected and spurious effects arising from the high intensity of gamma radiation close to the detector can thereby be avoided.

With a logging instrument such as is shown in Figure 2, by varying the energy of the ejected gamma rays while the instrument is held at various depths in the hole more complete information as to the elements making up the surrounding formations can be obtained with one passage of the instrument through the hole.

In Figure 3 is shown a modification in which the well instrument housing 18 contains both a neutron detector 22 and a gamma ray detector 50, as well as a source of gamma rays 20 and a preamplifier 52 for receiving the output of the detectors. In order to shield the gamma ray detector 50 from direct gamma rays from the source 20, a shield or absorber 54 of lead, or the like, may be placed between the source and the detector 50, either between the detectors as shown, or below the neutron detector 22. The preamplified outputs of the detectors 22 and 50 are conducted to the surface over the cable 26 and to an amplifier 56 in any suitable manner such that the outputs of the two detectors are maintained separate so that they can be separately and simultaneously recorded as by means of the recorder 58 and 60.

As has been explained hereinbefore a gamma ray such as 34 from the source 20 may cause more or less neutrons 36 to be induced from the surrounding formations, depending upon the nature of these formations, and some of these neutrons such as shown at 38 may pass back to the hole and strike the neutron detector 22. At the same time some of these induced neutrons such as the one indicated at 62, for instance, may, by nuclear capture cause gamma rays to be released from the substances of which the formations are composed and one of these gamma rays is indicated at 64 as striking the gamma ray detector 50. The existence of neutrons registered by the detector 22 will only indicate the class of elements which may be present in the formations. If, in addition to this neutron measurement, a measurement is also made of the gamma rays released by the induced neutrons additional information can be obtained as to the nature of the traversed formations. A high intensity of neutrons might indicate the existence of silicon and thus a sandstone, for example. If, at the same time a high intensity of gamma rays is measured this may indicate the presence of hydrogen and thus the presence of, say, oil or water in the formation. Although hydrogen in the formation would tend to absorb the neutrons, if a large number of gamma rays are registered this will naturally indicate that a large number of neutrons had been induced or otherwise the gamma rays would not have been released.

Some of the gamma rays from the source 20 may be scattered in the surrounding materials so as to reach the detector 50. These scattered gamma rays, having generally lesser energy than the gamma rays 64 released by the capture of the neutrons 62 may, if desired, be prevented from actuating the detector 50 by suitable means such, for example, as by surrounding that detector with a shield of lead or the like thick enough to absorb scattered gamma rays but not thick enough to absorb the higher energy gamma rays released by neutron capture.

When the gamma rays are generated by an artificial source such as the betatron of Figure 2, gamma rays scattered from a pulse so generated will reach the detector 50 substantially instantaneously. The released gamma rays 64 will, however, be delayed in reaching the detector 50 due to the time required for the neutrons 62 to scatter or travel around in the formation before striking nuclei from which the gamma rays will be released. By suitably measuring the time between the generation of a gamma ray pulse by the betatron and the arrival of the released gamma rays at the detector 50, additional informations may be had as to the nature of the materials or formations in which the scattering or releasing of the gamma rays occurs.

The signals or outputs from the two detectors 22 and 50 can be conducted to the surface in any suitable manner and, if desired, over the same cable conductor which serves to conduct the electrical energy to the instrument in the well as is described, for example, in the copending patent application of Gerhard Herzog, Serial No. 584,164, filed March 22, 1945, now U. S. Letters Patent No. 2,481,014, granted September 6, 1949.

Obviously many modifications and variations of the invention as hereinbefore set forth, may be made without departing from the spirit and scope thereof, but only such limitations should be imposed as are indicated in the appended claims.

We claim:

1. The method of logging a bore hole traversing subsurface formations which comprises passing through said hole a source of gamma-rays capable of penetrating said formations to induce neutrons therefrom, and measuring variations in the intensity of the induced neutrons reaching the hole from said formations as the source and neutron detector are moved through the hole.

2. The method of logging a bore-hole traversing subsurface formations which comprises generating at a plurality of points within said hole gamma rays capable of penetrating the formations to induce neutrons therefrom, and measuring the intensities of the induced neutrons reaching the hole from the formations surrounding said points.

3. The method of logging a bore-hole traversing subsurface formations which comprises passing through said hole a source of gamma-rays capable of penetrating said formations to induce neutrons therefrom, the intensity of the neutrons so induced being dependent upon the nature of said formations, and measuring the intensities of the induced neutrons reaching the hole in the vicinity of said source as the source is moved through the hole.

4. The method of logging a bore-hole traversing subsurface formations which comprises bombarding the formations surrounding a point within said hole with gamma rays capable of penetrating the formations to induce neutrons therefrom, measuring the intensity of the induced neutrons reaching the hole from the formations surrounding said point, and repeating said operation using gamma rays of different energy from those used in the first operation.

5. The method of logging a bore hole traversing subsurface formations which comprises bombarding the formations surrounding a point in said hole with gamma rays of progressively different energies, measuring the intensities of the neutrons induced in said formations by said bombardment and passing into the hole near said point, the neutron intensities so measured being indicative of the nature of said formations, and repeating these bombarding and measuring operations at other points in the hole.

6. The method of logging a bore-hole traversing subsurface formations which comprises passing through said hole a source of gamma-rays capable of penetrating said formations to cause neutrons to be ejected therefrom, some of the ejected neutrons also causing gamma rays to be released from the formations by nuclear capture, the intensity of the neutrons so ejected and the gamma rays so released being dependent upon the nature of said formations, and measuring the intensities of the induced neutrons and the released gamma rays reaching the hole in the vicinity of said source as the source is moved through the hole.

7. Apparatus for logging a bore hole traversing subsurface formations comprising a housing, a source of gamma radiation disposed within said housing so that gamma rays will penetrate the surrounding formations to cause neutrons to be induced therein, a detector within the housing responsive to induced neutrons passing into the bore hole, a cable for supporting said housing so that it can be passed through said bore hole and for conducting the output of said detector to the surface, and means at the surface for recording the output of said detector.

8. Apparatus for logging a bore hole traversing subsurface formations comprising a housing, a generator of gamma radiation and a detector of neutrons in said housing, said gamma radiation having sufficient energy to cause neutrons to be induced in said formation, a cable supporting said housing in said bore hole for conducting to the surface the output of said detector and for conducting from the surface electrical current for energizing said generator, and means at the surface for recording the output of said detector.

9. Apparatus for logging a bore hole traversing subsurface formations comprising a housing, a source of gamma rays, a detector of neutrons induced in said formations by the action of said gamma rays, a detector of gamma rays produced by the action of said induced neutrons on the atoms of said formations, said source, neutron detector and gamma ray detector being disposed within said housing, a cable for supporting said housing in its passage through said bore hole and for conducting the output of said detectors to the surface and means at the surface for amplifying and recording the output of said detectors.

ARNOLD J. F. SIEGERT.
BOB E. WATT.

REFERENCES CITED

The following references are of record in the file of this patent:

UNITED STATES PATENTS

| Number | Name | Date |
| --- | --- | --- |
| 2,296,176 | Neufeld | Sept. 15, 1942 |
| 2,323,484 | Neufeld | July 6, 1943 |
| 2,345,119 | Hare | Mar. 28, 1944 |

OTHER REFERENCES

Livingston and Bethe, Article in Reviews of Modern Physics, vol. 9, July 1937, pp. 351–353.

Atomic Physics, Physics Staff of the University of Pittsburgh, John Wiley and Sons, 1937, p. 93.